(12) United States Patent
Sheets

(10) Patent No.: US 9,589,152 B2
(45) Date of Patent: Mar. 7, 2017

(54) SYSTEM AND METHOD FOR SENSITIVE DATA FIELD HASHING

(75) Inventor: John Sheets, San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1618 days.

(21) Appl. No.: 12/233,206

(22) Filed: Sep. 18, 2008

(65) Prior Publication Data

US 2009/0077104 A1    Mar. 19, 2009

Related U.S. Application Data

(60) Provisional application No. 60/973,677, filed on Sep. 19, 2007.

(51) Int. Cl.
*G06F 17/30* (2006.01)
*G06F 21/64* (2013.01)
*H04L 29/06* (2006.01)

(52) U.S. Cl.
CPC .......... *G06F 21/64* (2013.01); *H04L 63/0428* (2013.01); *H04L 63/12* (2013.01)

(58) Field of Classification Search
CPC ...... G06F 21/64; H04L 63/0428; H04L 63/12
See application file for complete search history.

(56) References Cited

U.S. PATENT DOCUMENTS

| | | | |
|---|---|---|---|
| 6,516,320 B1* | 2/2003 | Odom et al. | 707/747 |
| 7,058,639 B1* | 6/2006 | Chatterjee et al. | |
| 7,761,374 B2* | 7/2010 | Sahota et al. | 705/39 |
| 7,801,825 B2* | 9/2010 | Kranzley et al. | 705/67 |
| 8,024,266 B1* | 9/2011 | Barber | 705/39 |
| 2002/0133721 A1* | 9/2002 | Adjaoute | 713/201 |
| 2005/0043997 A1* | 2/2005 | Sahota et al. | 705/16 |
| 2005/0089160 A1* | 4/2005 | Crispin et al. | 380/28 |
| 2005/0210035 A1* | 9/2005 | Kester et al. | 707/10 |
| 2007/0033419 A1* | 2/2007 | Kocher et al. | 713/193 |
| 2007/0277031 A1* | 11/2007 | Ginter et al. | 713/155 |
| 2008/0052270 A1* | 2/2008 | Karlsson | 707/3 |
| 2008/0147554 A1* | 6/2008 | Stevens et al. | 705/51 |
| 2009/0006842 A1* | 1/2009 | Ross et al. | 713/155 |

* cited by examiner

*Primary Examiner* — Scott A Waldron
*Assistant Examiner* — Mellissa M Ohba

(57) ABSTRACT

Data to be exchanged in a transaction is protected by using a hashing function to transform sensitive data into a scrambled form. The hashing function can use as its inputs data derived entirely or in part from portions of the data to be exchanged. The hashing function can also use as its inputs data derived entirely or in part from other locally available data. The output of the hash function is then transmitted to a destination that attempts to recreate the output of the hash function in order to validate the data transmission.

16 Claims, 10 Drawing Sheets

SYSTEM AND METHOD FOR SENSITIVE DATA FIELD HASHING

CROSS-REFERENCES TO RELATED APPLICATIONS

This application claims priority to U.S. Provisional Patent Application No. 60/973,677, entitled "System and Method for Sensitive Data Field Hashing" filed Sep. 19, 2007, which is hereby incorporated in its entirety for all purposes.

BACKGROUND

Modern technologies, such as the Internet and other electronic communication networks, allow parties to transact at a distance. Remote transactions, such as electronic commerce, have become ubiquitous. Additionally, cashless transactions, using a variety of alternative payment instruments, such as credit cards and "electronic checks," have become increasingly common. While this modern technology has made it convenient to engage in commerce at any time or location, the use of untrusted networks such as the Internet, when combined with the increasing use of financial instruments, has, however, provided new opportunities for fraudulent access to or misuse of sensitive data. This unauthorized access may allow, for example, the execution of fraudulent financial transactions, potentially without the knowledge of either party to a legitimate transaction. Alternatively, leakage of sensitive information may allow an eavesdropper or "hacker" to fraudulently authenticate himself to other parties, thus gaining unauthorized access to data, resources, or money. Modern networks, by the nature of the technology, may make many copies, transient or permanent, of transmitted data, therefore increasing the likelihood of unauthorized "leakage" of secret or sensitive information. Due to the distributed nature of modern digital networks such as the Internet, as well as the manner in which computers operate, it is nearly impossible to ensure that every instance of sensitive data is deleted.

One way to reduce the likelihood of fraudulent use of sensitive data is to re-engineer systems so that the data is never stored or transmitted except in a suitably scrambled form. This is typically accomplished by performing a cryptographic operation on the data, thus changing its form. If the form of the data changes extensively, entire communication networks may need to be redesigned at great expense, as various network resources assume the data to have a particular size and field arrangement. Additionally, not all data being exchanged during a transaction is sensitive, and thus encrypting all of it is a waste of computing resources. Encryption also requires the creation, distribution, and management of keys. Having to manage keys results in more complicated networks increases the opportunities for inadvertent leakage of secrets. Encryption also requires decryption before protected data can be used. Finally, methods of encrypting data known in the art may require data to be decrypted and re-encrypted multiple times as it passes from system to system or between domains within systems.

It would be desirable to have methods and systems for enabling sensitive data fields to be transformed at the point of data entry in such as way that this transformation need only occur once, at the time of transaction data collection. It would also be desirable if such methods and systems did not require extensive re-engineering of existing networks. It would also be desirable if such methods and systems did not require the computational resources associated with cryptographic computations. It would also be desirable if such methods and systems did not require the creation, distribution, and management of cryptographic keys.

Embodiments of the invention address these problems and other problems individually and collectively.

SUMMARY

Embodiments of the present invention are directed to solving or overcoming one or more of the above-described problems in the context of commercial transactions taking place over communication networks. The techniques used in these various embodiments also are applicable to a broader range of information exchanges.

One embodiment is directed to a method for securing data using a dynamic hash. The method can comprise creating a first hash input from first data in a first set of data fields selected from a first collection of data, performing a hash operation on the first hash input to create a first hash output, assembling a second collection of data using said first hash output and second data in a second set of data fields selected from the first collection of data, and validating the second collection of data using the first hash output.

Another embodiment of the invention is directed to method for validating data received over a network. The method can comprise receiving a collection of data from a source in communication with a network, wherein the collection of data includes a first hash output of a hash operation, constructing a second hash output using the hash operation from a hash input, wherein the hash input is created from data contained in the collection of data and other locally available data, comparing the first hash output with the second hash output, and validating the collection of data based on the comparison of the first hash output and the second hash output.

Another embodiment is directed to a computer software product that may be present in a device designed to transmit sensitive data. The computer software product can be embodied in a computer-readable medium comprising code or instructions that are executable by a processor in a computer. The computer software product may comprise code for creating a first hash input from first data in a first set of data fields selected from a first collection of data, code for performing a hash operation on the first hash input to create a first hash output, code for assembling a second collection of data using said first hash output and second data in a second set of data fields selected from the first collection of data, and code for transmitting the second collection of data to a destination over a network.

Another embodiment is directed to a computer software product that may be present in a device designed to receive sensitive data. The computer software product can be embodied in a computer-readable medium comprising code or instructions executable by a processor in a computer. The computer software product can comprise code for receiving a collection of data over a network, wherein the collection of data contains a first hash output, code for creating a hash input, code for performing a hash operation on the hash input to create a second hash output, code for comparing the first hash output to the second hash output, and code for validating the collection of data received over the network based on the comparison of the first hash output and the second hash output.

Another embodiment is directed to a terminal for transmitting sensitive data that has been protected using a hash function. The terminal may comprise of a processor, a memory, a network interface, and a computer-readable medium that includes instructions executable by the processor. The computer-readable medium may comprise code for creating a first hash input from first data in a first set of data fields selected from a first collection of data, code for performing a hash operation on the first hash input to create a first hash output, code for assembling a second collection of data using said first hash output and second data in a second set of data fields selected from the first collection of data, and code for transmitting the second collection of data to a destination over the network interface.

Another embodiment is directed to a terminal for receiving sensitive data that has been protected using a hash function. The terminal may comprise of a processor, a memory, a network interface, and a computer-readable medium executed by the processor. The computer-readable medium may comprise code for receiving a collection of data over the network interface wherein the collection of data contains a first hash output, code for creating a hash input, code for performing a hash operation on the hash input to create a second hash output, code for comparing the first hash output to the second hash output, and code for validating the collection of data received over the network based on the comparison of the first hash output and the second hash output.

These and other embodiments of the invention are described in further detail below.

DETAILED DESCRIPTION

Figure 1:
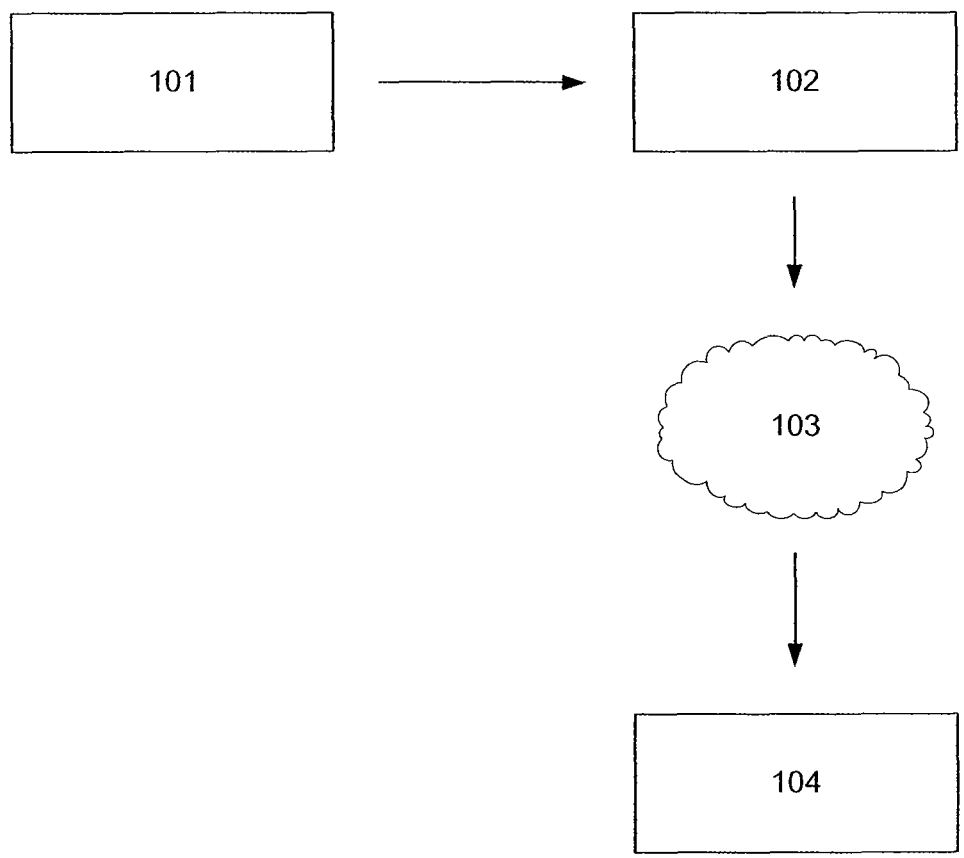
FIG. 1 illustrates some exemplary participants conducting a transaction according to an embodiment.

In an embodiment, data to be exchanged in a transaction is protected by using a hashing function to transform sensitive data fields in the data so that the sensitive data is sent in a scrambled form. The hashing function can use as its inputs data derived entirely or in part from portions of the data to be exchanged. The hashing function can also use as its inputs data derived entirely or in part from other locally available data.

The hashing function produces a hash output that can further be modified before being sent in a transmission. For example, in some embodiments, it may be desirable to map characters in the hash output from one form to another form in order to make the hash output compatible with other aspects of the data transmission. In other embodiments, it may be desirable to truncate the hash output or only use a portion of the hash output in the transmission.

Once the hash output is in a form suitable for transmission, the hash output can be appended to the data or can replace other fields that would otherwise be transmitted. After the transmitted data is received, the hashed data can be recreated at the receiving end of the transmission by using the transmitted data directly, by using the transmitted data to look up other data, or by using a combination of the transmitted data and data derived from the transmitted data. The recreated hash can then be compared to the hash contained in the transmitted data to validate the authenticity of the transmitted data.

One aspect of the proposed system and method is that sensitive data that would ordinarily be used to validate the transmission does not need to be sent in the clear as a part of the transmitted data, because the transmission is instead validated based on the exchanged hash output. The hash output serves as a proxy for the sensitive data, because the sensitive data can be used among the inputs to the hash function. In order to successfully recreate the hash output value at the receiving end of the transmission, the same input values are used in the same hash function to create the hash output. This means that if sensitive data is used to create the hash output, then both ends of the transaction need to have the correct values for this sensitive data if the hash output values are to match. One consequence of this is that it is possible to verify that both sides of a transaction held the sensitive data normally used to validate the transaction without actually sending the sensitive data in the transmission. This helps protect the sensitive data from unauthorized access over the network because it is not directly sent in the transmission.

It may be useful to refer to some terms that are used in describing the present system and method.

A "field" can be a subdivision of a collection of data. The collection of data may be a transmitted message, a stored record or database, or any other amalgam of information existing in a form suitable for storage on a computer, processing by a computer, or transmission on a network.

A "character" can be a subdivision of a field. For example, a character may be what is commonly known in the art as a byte or word.

A "datatype" can be the allowable set of values which a character may assume. Examples include decimal integer numbers, booleans, or lower-cased characters.

A "transaction" can be a flow of information between entries, such as a payer and a payee.

A "hash" can be a function that maps a field of arbitrary length and datatype to a fixed-length or arbitrary-length series of characters in such as a way that it is computationally infeasible to find any two distinct inputs which map to the same output. Examples of well-known hash functions include SHA-1 and MD5.

A "nonce" can be a value that is not be repeatable, except by chance. A nonce may be, but need not be, random or unpredictable, so long as it is computationally infeasible for anyone external to the system to force the result to a given value.

FIG. 1 shows a diagram with various entities in a system according to an embodiment of the invention. As shown in FIG. 1, the transaction processing system may include an information provider 101, a point of data entry 102, a communications network 103, and an information consumer 104. The information provider 101 may transmit data to the information consumer 104 over the communications network 103 via the point of data entry 102. The data transmitted may contain some sensitive data.

In an embodiment, the information provider 101 may be a consumer or someone authorized to use a payment instrument such as a credit card, smartcard, or other consumer input device.

The point of data entry 102 can be any device that takes the information from the information provider 101 and sends that information to the information consumer 104 over the network 103. Example embodiments of the point of data entry 102 include an ATM, a computer, a point of sale or payment acceptance terminal, a telephone, a PDA, a Blackberry, a gaming console, an interactive kiosk and other similar devices. In certain embodiments, the point of data entry 102 may be the same as the payment instrument used by the information provider 101.

The communications network 103 may be the Internet, an intranet, or any other data network. The communications network 103 may include one or more computers operatively coupled together to perform one or more predetermined functions.

The information consumer 104 can be any device connected to the network that is an intended destination for the information sent by the information provider 101. Example embodiments of an information consumer include payment processing systems, such as VisaNet™, or any server on the Internet. An issuer may also operate a server computer, which may receive data from the point of entry 102.

In an embodiment, the methods of the present invention may take place inside a payment acceptance terminal or other point of data entry. In another embodiment, a consumer input device such as a token, smartcard or other device in possession of the information provider capable of performing the computational operations may implement the present invention. This embodiment can protect sensitive data fields before the sensitive data is exposed to a merchant. For example, a merchant may want to authenticate the payment instrument used by an information provider. The merchant can transmit a hash output to a payment processing system. The hash output may be created at least in part from the sensitive data by the information provider. This hash output allows the information destination to authenticate the consumer input device without the merchant, or any other entity on the network, ever having access to the actual values of the sensitive data.

In an embodiment, the sensitive data to be protected can consist of data associated with a credit card, payment instrument, or other consumer input device. For example, the data may comprise a primary account identifier consisting of 16 decimal digits. The data may also comprise an expiration date. The expiration date may consist of 4 decimal digits in a YYMM format. Various other values may be stored on or available to the smart card, token, or a computational device. For instance, a service code (SVC), card verification value (CVV), personal identification number (PIN), verification key index (PVKI), discretionary data, and PIN verification value may additionally be stored on or be available to the smart card, token, or a computational device.

Figure 2:
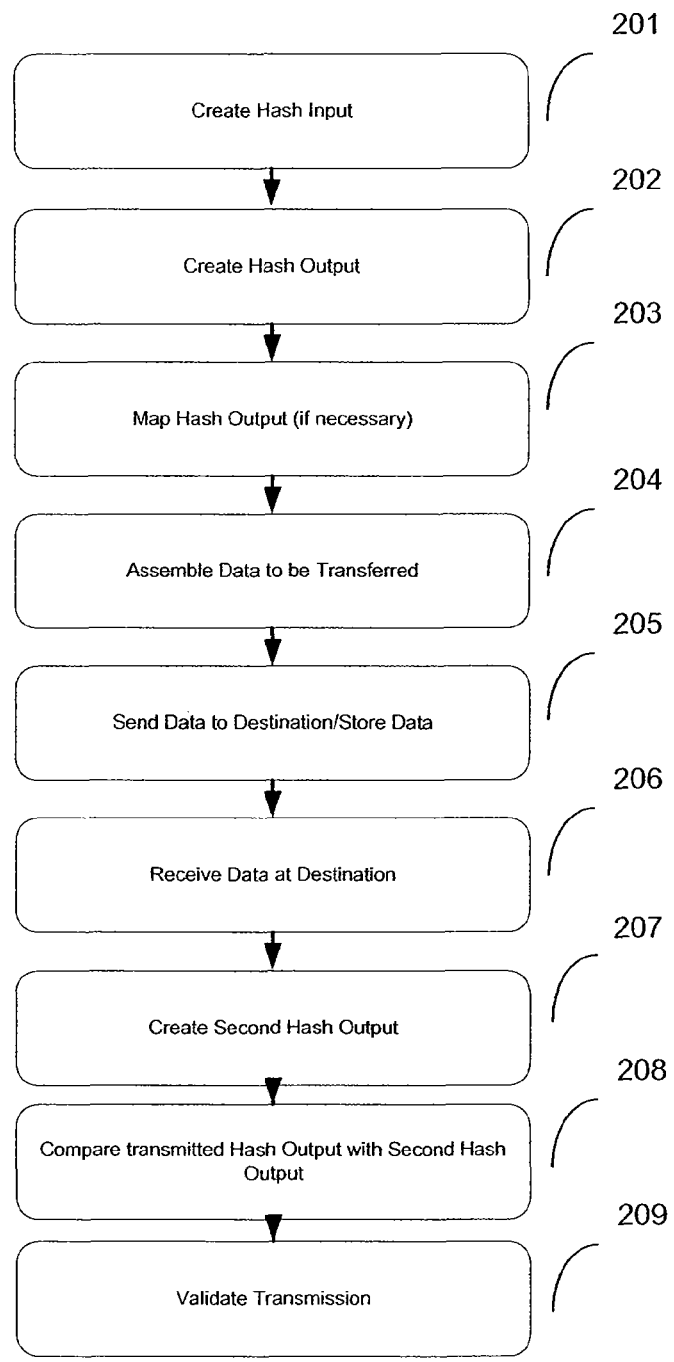
FIG. 2 is a flow chart showing the steps involved in securing sensitive data according to an embodiment.

FIG. 2 is a flow chart showing the steps involved in securing sensitive data according to an embodiment of the invention. The steps outlined in FIG. 2 may be embodied in a computer readable medium. The computer readable medium can then be contained in a portable consumer device, point of sale terminal, server, information provider, point of data entry, information consumer, or any other similar device. The computer readable medium can also be distributed between two or more of the aforementioned devices.

At step 201, a hash input is created from a set of data fields. The data fields contain data that can originate from the information provider or from the point of entry. The data may be, for example, data associated with a payment instrument such as a credit card, and the fields may then contain relevant information such as a primary account number (PAN), expiration data, card verification value (CVV), and the like. The data may also include time stamps, transaction amounts, or nonces. This data may be generated from an information provider, a point of entry, or some combination of the two.

Each field in the set of data fields may be designated to have a particular length and data type, although it will be apparent to one skilled in the art that the present invention may have application regardless of whether a given field is fixed or of variable length. Some of the fields may represent pre-stored data, while others may be generated "on-the-fly" and used to support the protection mechanisms encompassed by the present invention. In addition, the data in the data fields used to create the hash input may be combined using various mathematical or other functions known in the art before they are used in the hash function.

A hash function is then applied to the assembled hash input in order to create a hash output in step 202. The length of the hash output can be a fixed length output or an arbitrary length output depending on the exact hash function applied to the hash input. Sensitive data fields can be a part of the hash input, and consequently they are transformed by the hash function. Additionally, if the hash input includes data such as a nonce, then the resulting hash output can vary each time it is created even if the other more substantive data in the hash input remains constant.

The hash output may then need to be mapped, as by element, to the datatype of the corresponding destination field. This step is shown at 203, and the step may not be necessary depending on the particular needs of an embodiment. This mapping may be via character-by-character translation, as by table lookup, or via a modulus or other mathematical operation or operations.

There may be many reasons for mapping the hash output. For instance, the existing infrastructure used to transmit and validate data sent for a given transaction may have size, datatype, or field arrangement restrictions that are at odds with the hash output as produced by the hash function. The mapping step can convert the hash output to a compatible format while maintaining the essential features of the hash output.

At step 204, the mapped characters of the hash output can then be combined with other data to form a collection of data that is to be transmitted to an information destination. The collection of data can be in a well-known format or data structure typically used to transmit data for the purposes of the instant transaction. The mapped hash output can be added to or injected within the data structure of the collection of data. The mapped hash output may also replace an existing field in the data structure of the collection of data.

Once the collection of data is assembled, it may be stored or transmitted. This step is shown at 205. If the collection of data is stored, it can be transmitted to an information destination at a later time. The stored collection of data could also be used locally at a later time.

Steps 201 through 205 can take place on a device controlled by the information provider, on a device acting as the point of data entry controlled by an entity such as a merchant, or split between these two devices in any way. The two devices can in fact be the same device in various embodiments. Furthermore, it is possible multiple devices supply data that is to be transmitted. One skilled in the art will recognize that there are many potential devices and combinations of devices that can be used to implement steps 201-205.

After the collection of data is sent over a network to an information destination, it is received by the information destination at step 206.

At step 207, the information destination creates a second hash output. The information destination does this by attempting to reconstruct the hash input created in step 201. The information destination can use data contained in the transmitted collection of data to help reconstruct the hash input. Some of the data in the transmitted collection of data can be directly used in a second hash input while other data in the transmitted collection of data can be used to find other data used in the second hash input. For example, a PAN may be transmitted in the collection of data. In an embodiment, the PAN may be directly used in the hash input used to create the hash output. In another embodiment, information associated with the PAN, but not contained in the transmitted data, is used in the hash input. For example, a PIN associated with a PAN might be a data field in the hash input, and the PIN can be determined by the information destination using the PAN in a database lookup process.

Once the new hash input is created, the same hash operation used in step 202 is used to create a new hash output at the information destination at step 207.

At step 208, the newly created hash output is then compared to the hash output contained in the transmitted collection of data. Because of the nature of the hash operation, if the information destination was able to successfully create a hash input identical to the hash input created in step 201 and apply the same hash operation to the hash input as in step 202, the new hash output created at the information destination should be identical to the hash output in the transmitted collection of data. If the hash output created at the information destination matches the hash output contained in the transmitted collection of data, then it shows that the information provider held all of the data used in the hash input.

This can be further illustrated by an example embodiment in which a PIN value associated with a PAN value is used to create a hash output, but the PIN value is not otherwise transmitted in the collection of data sent to the information destination. However, the PAN value is transmitted with the collection of data. The information destination then uses the PAN in the transmitted data to independently look up the PIN number associated with the PAN. This retrieved PIN value is then used by the information destination to help create a second hash output. If the hash output created matches the hash output transmitted, it shows that the information provider knew the correct PIN value without actually transmitting the PIN value. The PIN value is thus protected from eavesdroppers or other entities on the network that might wish to intercept the PIN and use it to conduct fraudulent transactions.

If the hash outputs match, then the entire collection of data can be considered valid, and appropriate action can take place at the information destination. This step is represented at step 209. An example of such an action that might be taken after the collection of data is validated is that the account listed in the transmitted data is charged with an amount also listed in the transmitted data. If the hash output values do not match, then the transmitted data can be discarded or other appropriate action can be taken.

Figure 3:
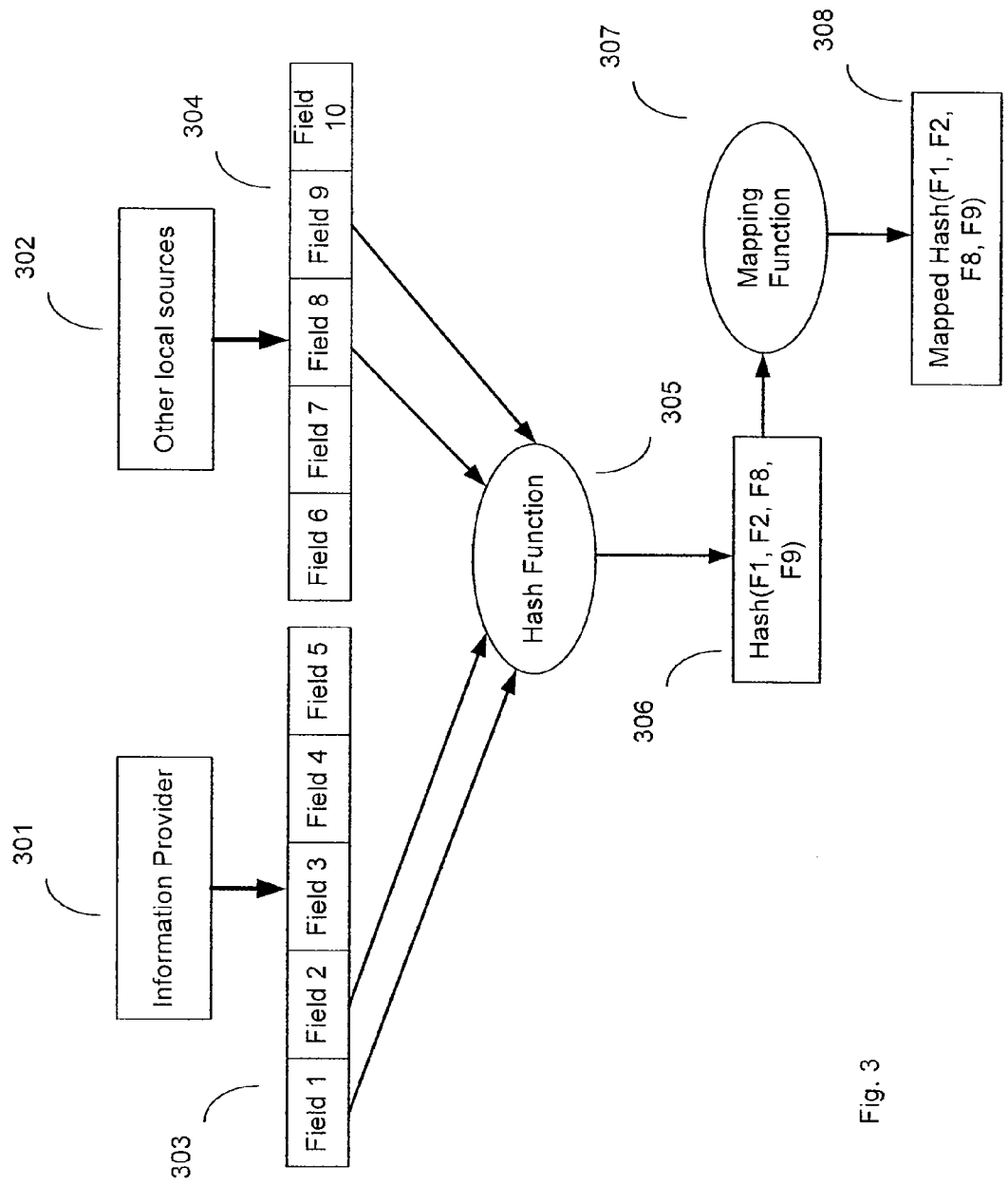
FIG. 3 illustrates creation of a hash from selected data fields according to an embodiment.
Figure 4:
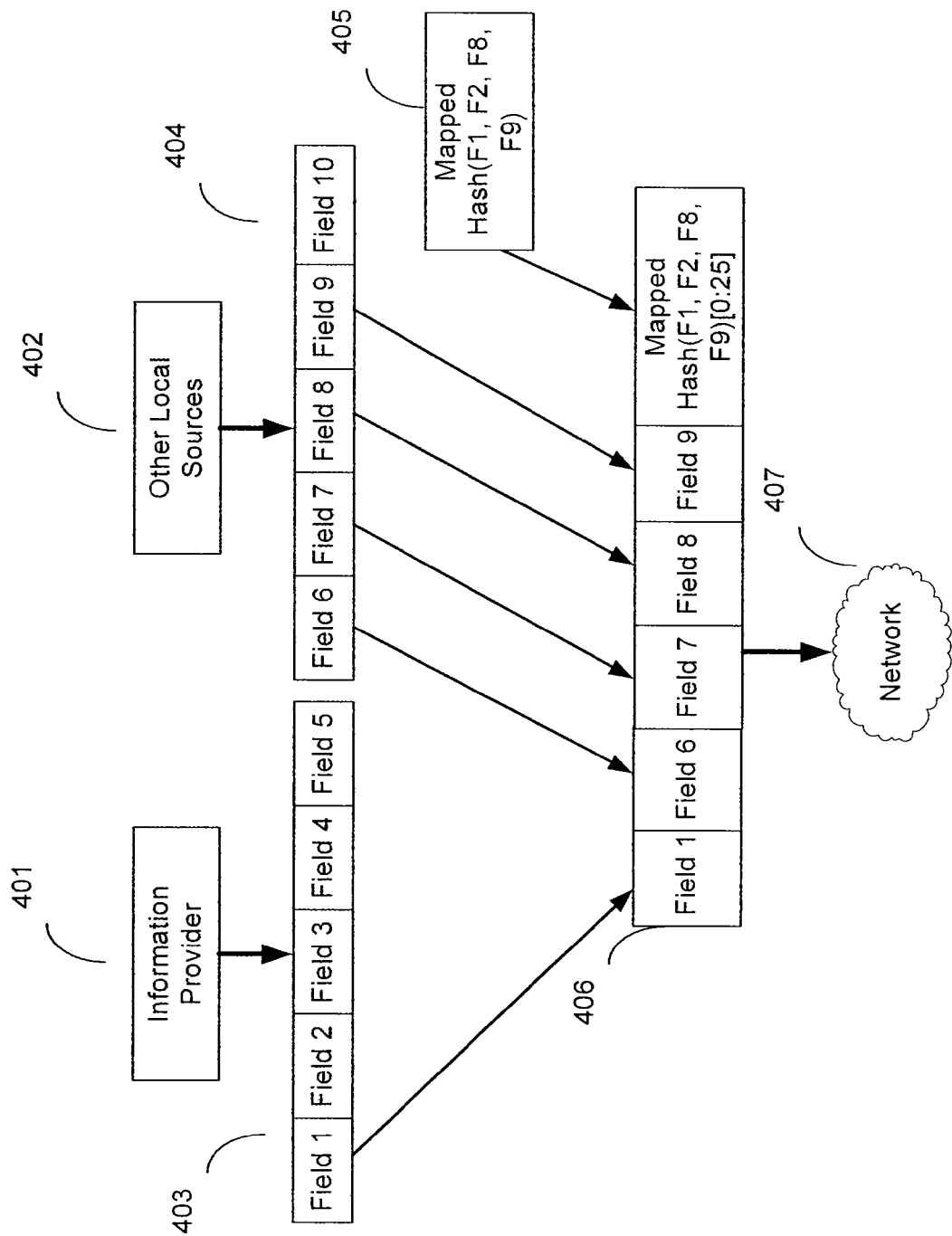
FIG. 4 illustrates the assembly of data fields according to an embodiment.
Figure 5:
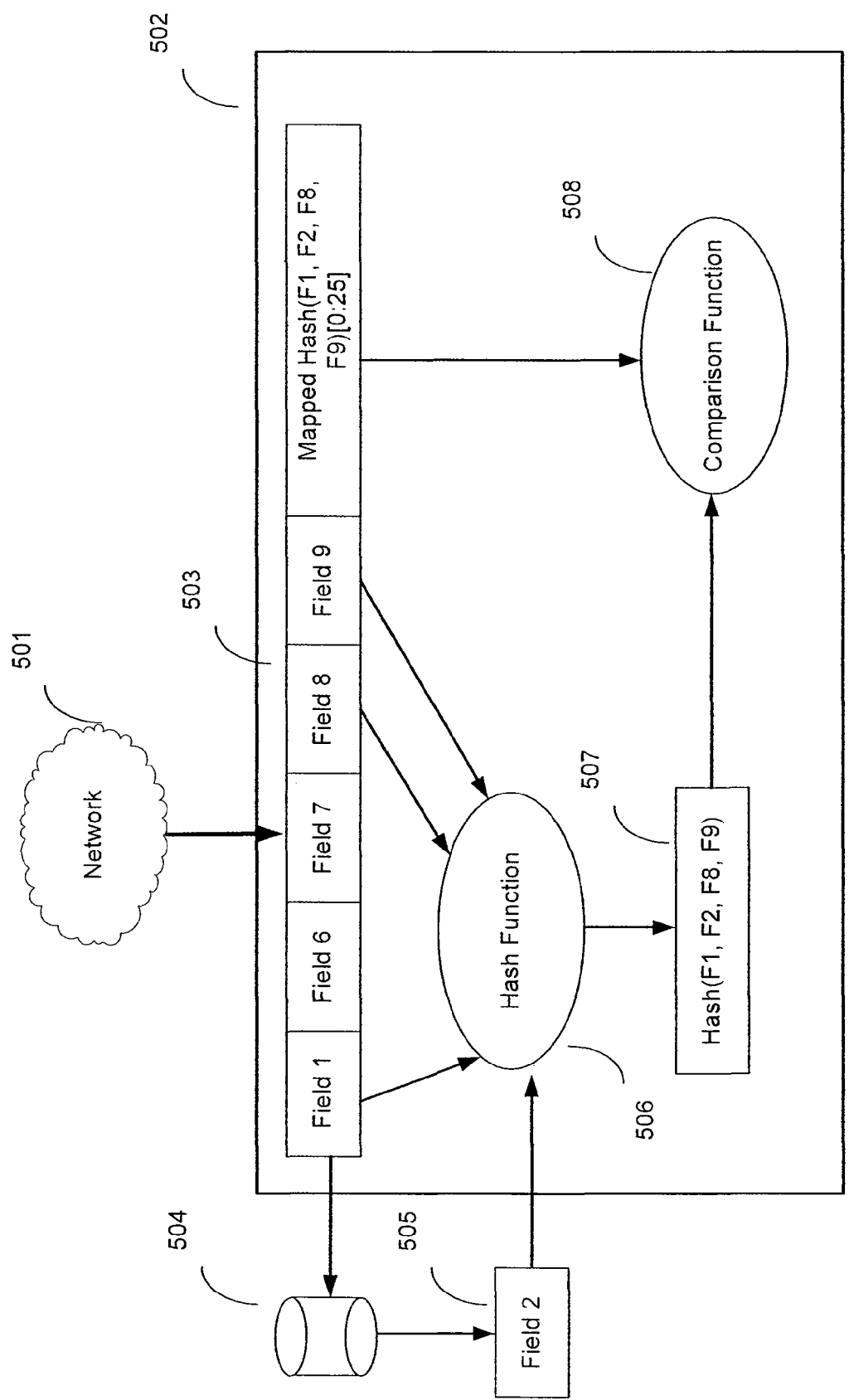
FIG. 5 illustrates how the hashed data can be used to authenticate data sent over a network according to an embodiment.

FIGS. 3, 4, and 5 show a more detailed view of how data is selected, transformed, transmitted, and verified according to an embodiment.

FIG. 3 is an illustration of how one embodiment of the invention can create a mapped hash output. In this example, two entities supply data that is used to create the hash output. The first entity is in this embodiment is the information provider 301 that provides data 303. The data 303 has been divided into Fields 1 through 5. The second entity providing data into this system comes from other locally available sources 302, and this entity provides a second set of data 304 that has been divided into Fields 6 through 10. Taken together, the data from the information provider 303 and from the other local sources 304 represent a first collection of data.

In an embodiment, the information provider 301 may provide its set of data 303 to the system by swiping a credit card or using some other consumer input device with an access device such as a point of sale terminal or payment terminal. Data 303 provided by the information provider 301 may include account numbers, expiration dates, CVV codes, and other data.

The access device may be the source of the other locally available data 304 and may provide data such as transaction price, transaction date, nonces, or other data. Of course, one skilled in the art will recognize that there are many alternative information providers 301 and sources of locally available information 302. Also, the actual data provided by each entity can vary between different embodiments. Finally, it is possible that there are additional entities that can supply data to the system other than the two entities shown in FIG. 3.

Fields from the first collection of data, 303 and 304, are then chosen as inputs to a hash function 305. In FIG. 3, the fields chosen for this purpose are Fields 1 and 2 from the first set of data 303 and Fields 8 and 9 from the second set of data 304. In one embodiment, Field 1 may be a primary account identifier and Field 2 may be a CVV. In the same embodiment, Field 8 may be the transaction value and Field 9 may be a timestamp.

The hash function 305 can be any function that maps a field of arbitrary length and datatype to a fixed-length or arbitrary-length series of characters in such as a way that it is computationally infeasible to find any two distinct inputs which map to the same output. Examples of well-known hash functions include SHA-1 and MD5.

The hash function 305 uses the data from the selected data fields to create a hash output 306. The hash output 306 can then be used as the input to a mapping function 307. The mapping function converts the hash output to a format that is compatible with any limitations imposed on the system. For instance, the mapping function might convert characters from one form to another to prevent illegal characters from being transmitted. The mapping function may alternatively condense or otherwise modify the hash output. Of course, the mapping function step is optional and depends on the limitations of a given embodiment.

FIG. 4 is an illustration of how the data to be transmitted to an information destination can be assembled after a hash output is created. In this embodiment, there are two entities 401 and 402 providing data 403 and 404 just as in FIG. 3. There is also a mapped hash output 405 that was created as shown in FIG. 3.

In the embodiment shown in FIG. 4, Field 1 from the first set of data 403 and Fields 6 through 9 from the second set of data 404 are selected to be a part of a second collection of data 406. The mapped hash output 405 is also inserted into the second collection of data 406. The second collection of data 406 is the data to be transmitted to the information destination over a network 407.

In this embodiment, only the first 25 characters of the mapped hash output 405 are inserted into the second collection of data 406. There may be many reasons for only using this subset of the mapped hash output 405. For example, the data structure of the second collection of data 406 may be a legacy data structure that has well-defined fields. The mapped hash output 405 would likely not be one of the fields typically used in this legacy data structure, and so the mapped hash output 405 would likely have to be inserted data fields reserved for future use or replace other data fields typically sent in the data structure. These data fields may have size limitations that exceed the size of the mapped hash output 405. In addition to data structure limitations, there are potential security benefits to only using a portion of the mapped hash output 405 in the second collection of data 405. These benefits are discussed more fully below in relation to FIG. 6.

FIG. 5 is a data flow diagram showing the actions taken by one embodiment of an information destination 502. Transmitted data 503 arrives at the information destination 502 over a network 501. The information destination 502 verifies the transmitted data by creating a second hash output 507 and comparing the locally created hash output 507 with the mapped hash output in the transmitted data 503.

The information destination 502 selects data fields to be used in a hashing function 506 to create a second hash output 507. If the data fields selected as the hash input and the hash function 506 are the same as the data fields and the hash function used to create the mapped hash output in the transmitted data 503, then the hash outputs will match and the transmitted data 503 will be authenticated because the match shows that the entity transmitting the data held the sensitive data needed to authenticate the transaction.

In the embodiment illustrated in FIG. 5, three of the fields used in the original hash input are directly present in the transmitted data 503. Those fields are Fields 1, 8, and 9. Field 2, however, is not present in the transmitted data. This additional data point can be found from another data source available at the information destination 502. In this embodiment, Field 2 is found by accessing a database 504 and conducting a database lookup using Field 1 as the key. Field 2 is then used as the final input to the hash function 506. The output of the hash function 506 is the second locally created hash output 507. In one embodiment, Field 1 may be a primary account identifier, Field 8 may be a transaction value, and Field 9 may be a timestamp. In the same embodiment, Field 2 may be a CVV, and Field 2 is protected because it was not included in the transmitted data along with Fields 1, 8, and 9.

The second hash output 507 is then used as one of the inputs to a comparison function 508. The other input to the comparison function in this embodiment is the mapped hash output taken directly from the transmitted data 503. In this embodiment, only the first 25 characters (or any other suitable number of characters) of the mapped hash output have been transmitted in the transmitted data 503. Also in this embodiment, the second hash output 507 has not had its characters mapped in any way like the mapped hash output from the transmitted data 502. The comparison function 508 can account for all of this in a variety of ways. For example, the comparison function 508 may map the entire second hash output 507 and then compare the only the first 25 characters of the now mapped second hash output 507. Alternatively, the comparison function might undo the mapping of the characters in the mapped hash output from the transmitted data 503 and then compare that unmapped data to the second hash output 507.

The comparison function 508 can then report to the information destination 502 the result of the comparison. Based on the result of the comparison, the information destination 502 can take appropriate action. For example, in the context of a financial transaction embodiment, the information destination 502 may record the transaction data represented by the transmitted data 503 and signal back to the source of the transmitted data 503 that the transaction has been approved.

Figure 6:
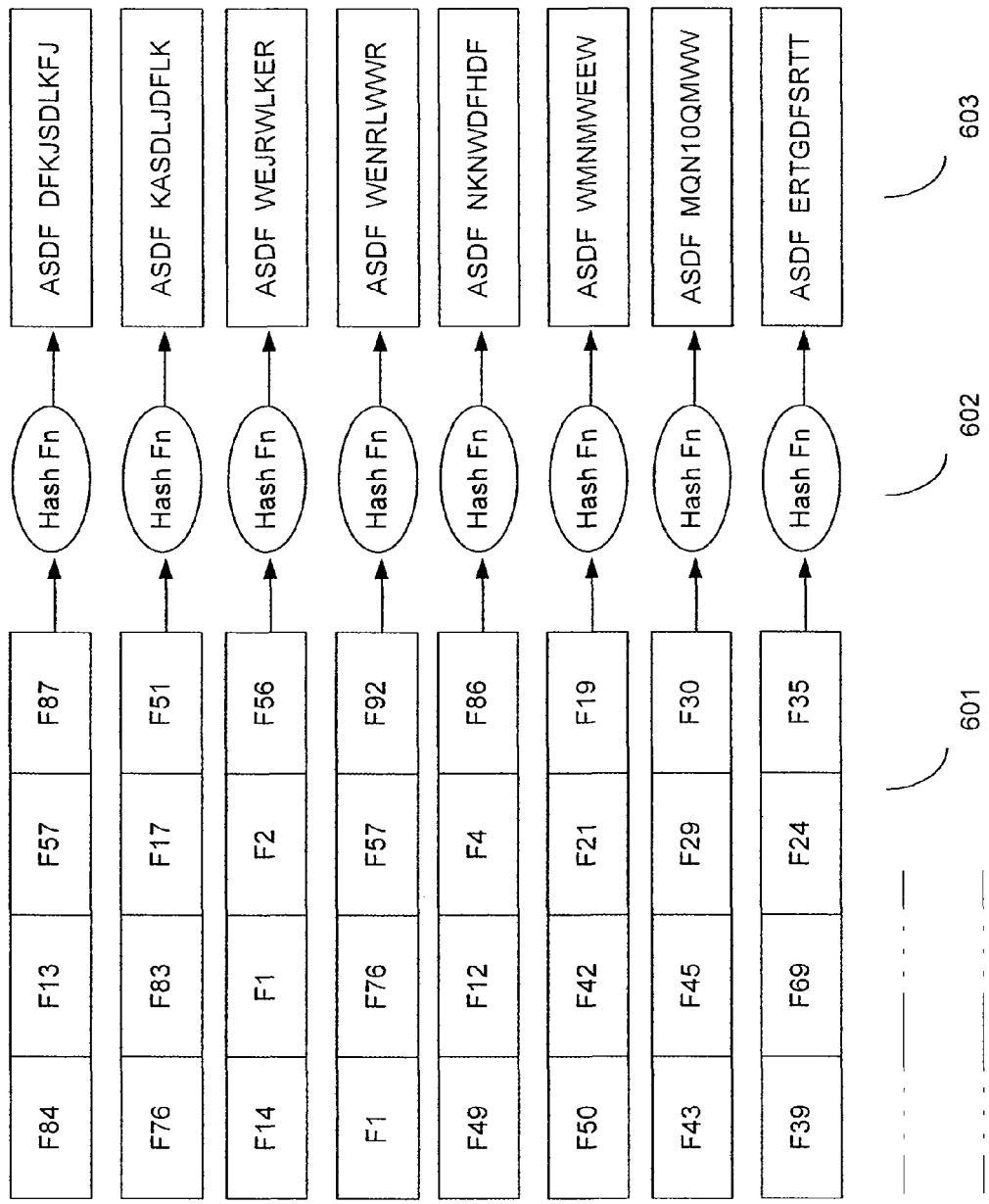
FIG. 6 illustrates data collisions.

FIG. 6 is an illustration of data collisions. A collision occurs whenever two or more distinct inputs to a hash function yield the same output. A high frequency of collisions is often considered an undesirable aspect of a hash function, because the higher the rate of collusions, the lower the confidence will be that the hash output will have been created from the desired hash input. Hash functions that produce fixed-length hash outputs for any hash input will always have produce some collisions. Typically, the greater the length of the hash output, the lower the rate of collusions.

FIG. 6 shows many different sets of data 601 being used as inputs to the same hash function 602 producing corresponding hash outputs 603. While all of the hash outputs are unique in FIG. 6, they all happen to have the same first 4 characters "ASDF." If only the first four characters of the hash outputs 603 were used as the hash output, then each of the hash inputs would collide with each other.

While a higher rate of collisions does mean that an entity like an information destination will be less certain that an information provider will have actually held the sensitive data needed to authenticate a transaction, collisions can be advantageous for certain embodiments of the proposed system and method. If transmitted data is intercepted and the correct hash function is known by someone with the intercepted data, then the ability of the person with the intercepted data to determine the exact input string used to create the hash output is diminished, because there are more combinations of values that yield the intercepted hash output. More information is required before someone could determine the exact input data used to create the intercepted output string, and thus the transmitted data is more secure. There is in effect a balance that can be struck between the confidence level an information destination can have in relying on the positive match of a hash output to verify that the information provider held key sensitive data and the extra security that one can achieve for the sensitive transmitted data if the transmitted data is intercepted or otherwise compromised. This is one reason why some embodiments may only use a portion of the hash output, rather than the entire hash output, when implementing the proposed systems and methods.

Figure 7:
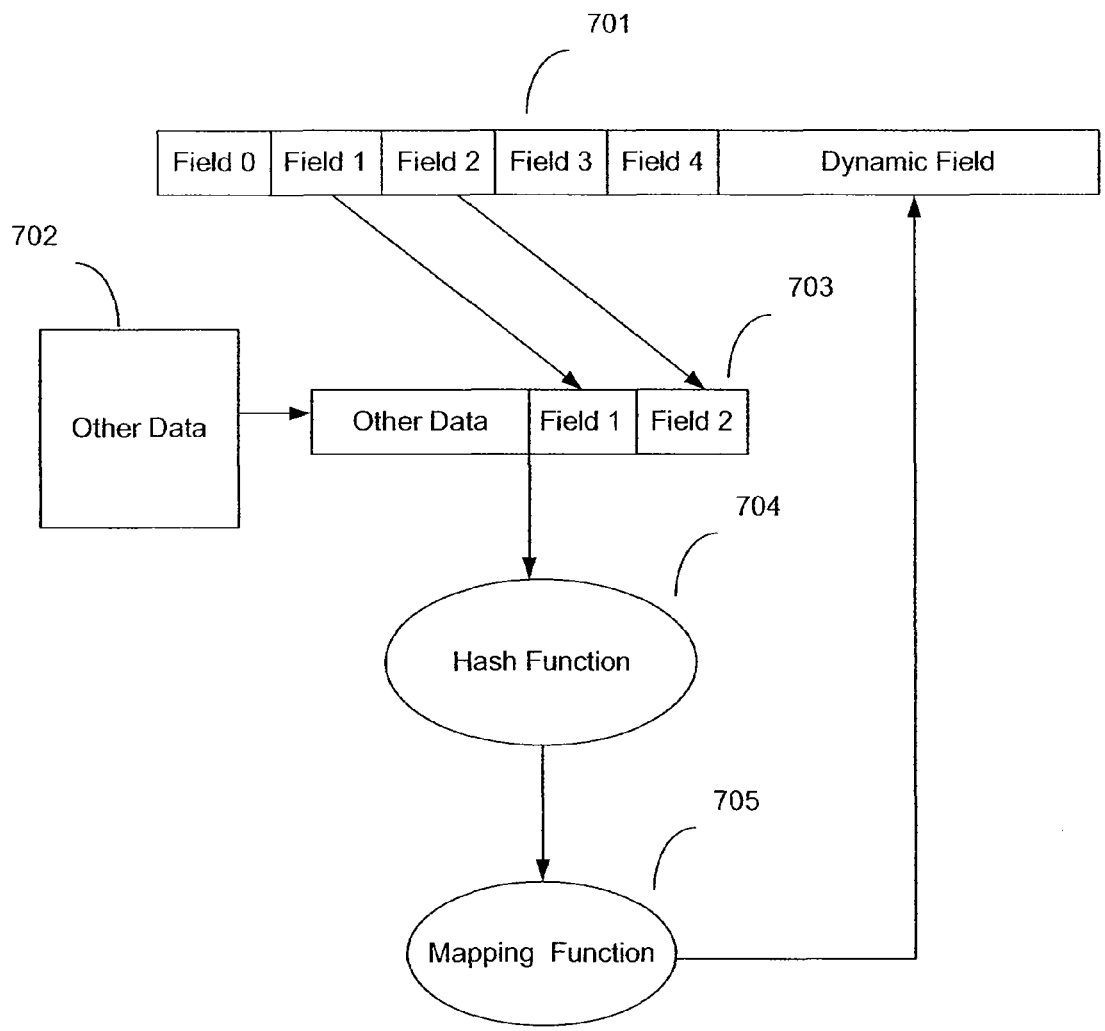
FIG. 7 is a flow diagram for an exemplary application of a transformation according to an embodiment.

FIG. 7 is another illustration of an embodiment of the proposed method. In FIG. 7, a collection of data 701 is arranged into fields. The fields may be classified as dynamic or not dynamic. Each field may be designated to have a particular length and data type.

In an embodiment, fields from the collection of data 701 can be taken alone or combined with other data 702 to form a hash input 703. This hash input is then given to a hash function 704 that can produce a fixed-length output. This output can consist of a series of characters that may need to be mapped by a mapping function 705 to the datatype corresponding to the destination field. Once the mapped hash output is inserted back into the collection of data 701, the collection of data can be stored or transmitted. Any party wishing to confirm the authenticity of the data can apply the hash function to the same hash inputs to determine if the dynamic field is correct, thus verifying the data's authenticity. With each transaction, or periodically, the value of the dynamic field may change.

Exemplary Access Devices, Portable Consumer Devices, and Computer Apparatuses

Figure 8A:
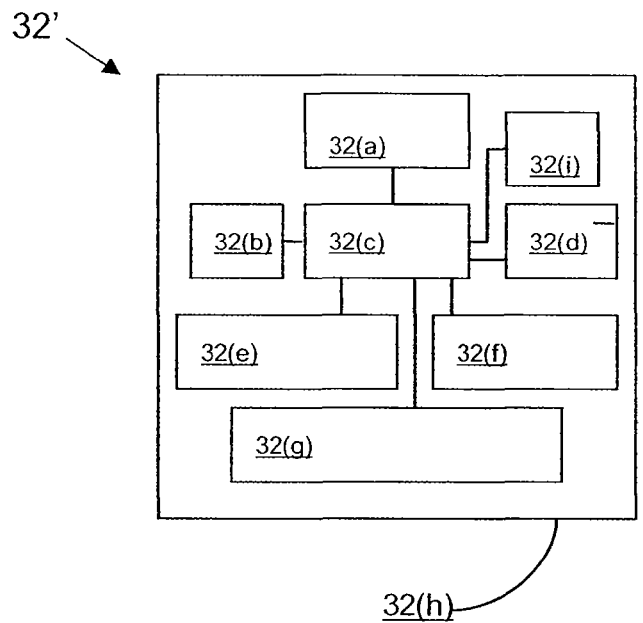
FIG. 8 shows block diagrams of exemplary portable consumer devices.
Figure 8B:
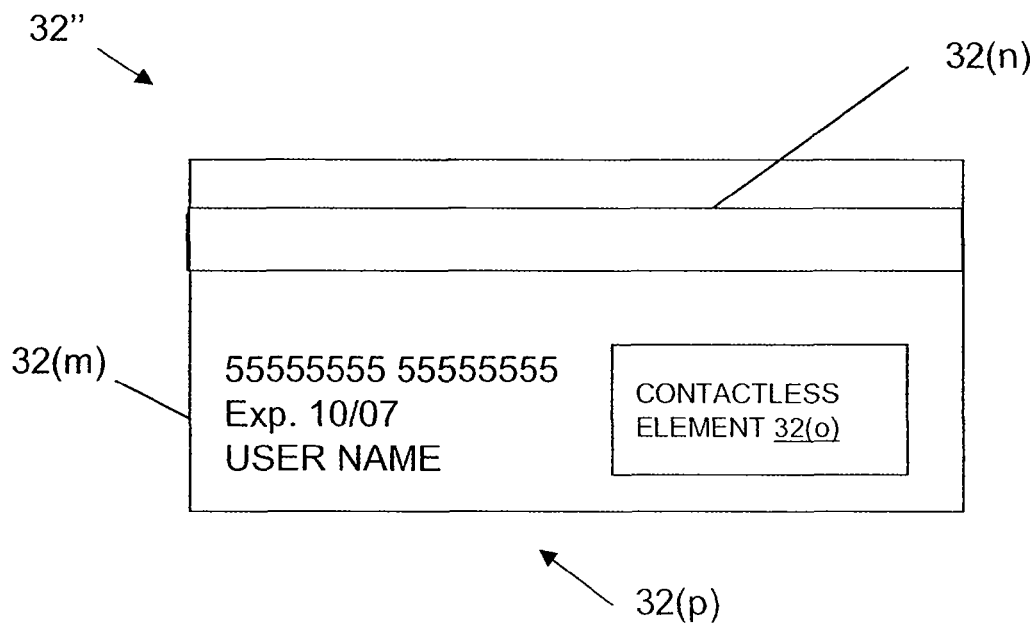
Figure 9:
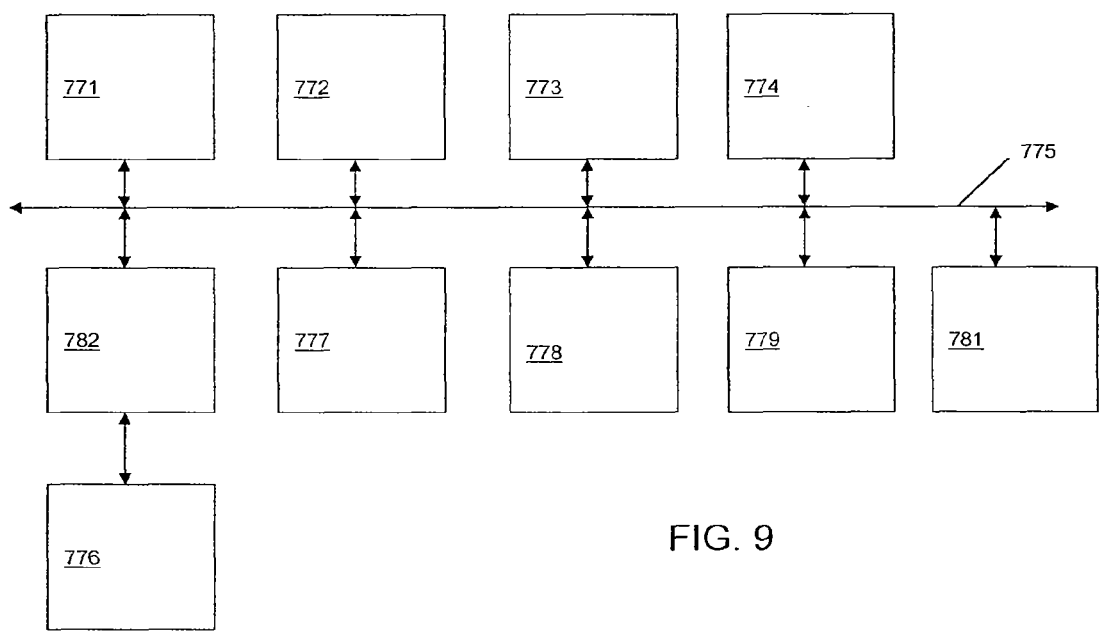
FIG. 9 shows an block diagram of an exemplary computer apparatus.

FIGS. 8-9 show block diagrams of portable computer devices and subsystems that may be present in computer apparatuses in systems according to embodiments of the invention. The portable consumer devices may be used by a business consumer, while the computer apparatus may be used by an information consumer such as an issuer or a payment processing organization.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones (e.g., the phone 34 described above), personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a phone may comprise a computer readable medium and a body as shown in FIG. 8(a). (FIG. 8(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32 and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 32" in the form of a card is shown in FIG. 8(b). FIG. 8(b) shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 8(b), the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

The various participants and elements in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 9. The subsystems shown in FIG. 9 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 10:
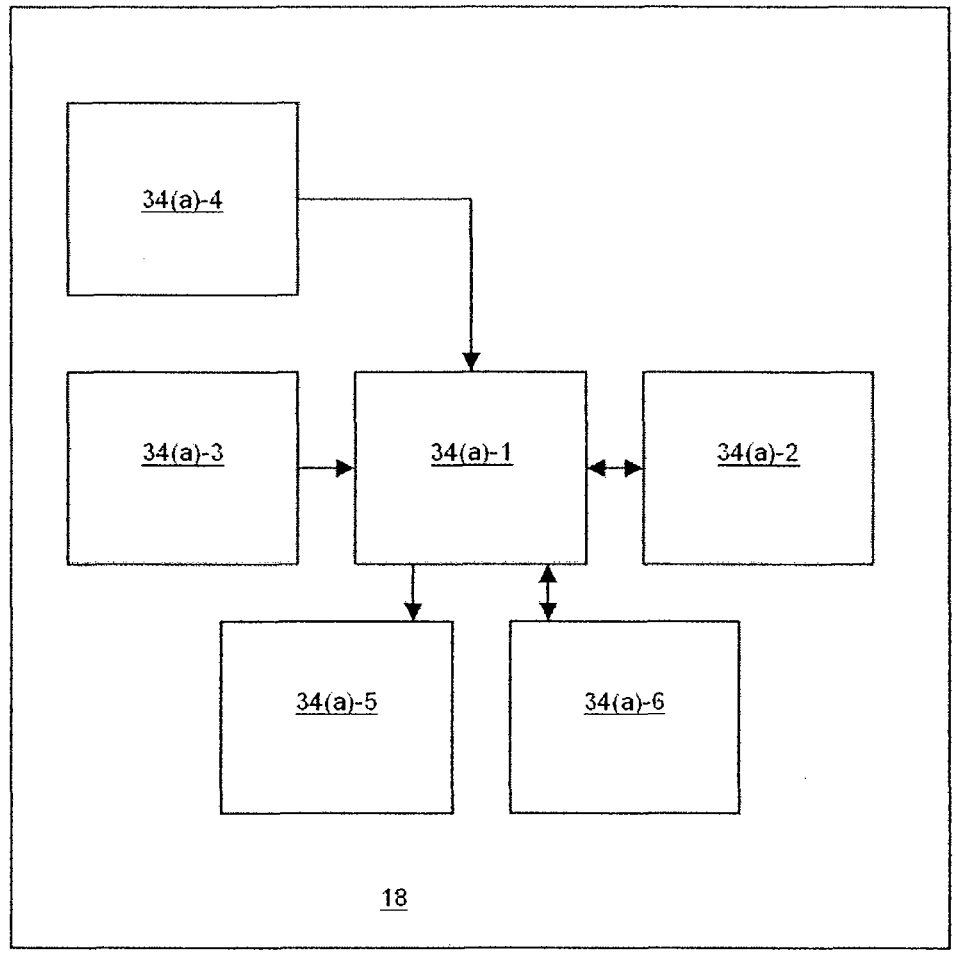
FIG. 10 shows a block diagram showing basic components that may reside in an exemplary access device.

FIG. 10 shows a block diagram showing basic components that may reside in an exemplary access device 14. The access device 14 may be an example of a point of data entry (as described above). An exemplary access device 14 may comprise a processor 14(a)-1. It may also comprise a computer readable medium 14(a)-2, keypad 14(a)-3, a portable consumer device reader 14(a)-4, an output device 14(a)-5, and a network interface 14(a)-6, all operatively coupled to the processor 14(a)-1. A housing may house one or more of these components. Exemplary portable consumer device readers can include RF (radio frequency) antennas, magnetic stripe readers, etc. that interact with a portable consumer device 32. Suitable output devices may include displays and audio output devices. Exemplary computer readable media may include one or more memory chips, disk drives, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Embodiments of the invention are not limited to the above-described embodiments. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for securing data using a dynamic hash, the method comprising:
   creating a first hash input including a first set of data fields selected from a first collection of data, the first set of data fields including a first data field obtained from a consumer input device by a point of data entry device, a second data field obtained from the consumer input device by the point of data entry device and a third data field obtained from the point of data entry device, the first data field including an account identifier obtained from the consumer input device, the second data field including sensitive data obtained from the consumer input device, the third data field including data having a value determined independent of the consumer input device;
   performing a hash operation on the first hash input to create a first hash output;
   assembling a second collection of data including (i) at least a portion of said first hash output and (ii) a second set of data fields selected from the first collection of data, the second set of data fields partially incorporating the first set of data fields at least in part by including the first data field obtained from the consumer input device and the third data field obtained from the point of data entry device and being distinct with respect to the first set of data fields at least in part by excluding the second data field obtained from the consumer input device; and
   securely communicating the sensitive data obtained from the consumer input device to the remote destination at least in part by transmitting the second collection of data over a network to a remote destination;
   wherein the second collection of data is assembled for each of a plurality of transactions with respect to an account identified by the account identifier and contents of said at least a portion of said first hash output changes for each of the plurality of transactions.

2. The method of claim 1 wherein the second collection of data is in a format compatible with a legacy data structure.

3. The method of claim 2 further comprising:
   mapping the first hash output to a format compatible with the format of the second collection of data.

4. The method of claim 1 further comprising:
   receiving the second collection of data at the remote destination;
   determining, at the remote destination, a fourth data field based at least in part on the first data field in the second collection of data;
   creating a second hash input from data available at the remote destination including the first data field, the third data field and the fourth data field;
   performing the hash operation on the second hash input to create a second hash output at the remote destination;
   comparing said at least a portion of said first hash output in the second collection of data to a corresponding at least a portion of the second hash output created at the remote destination; and
   determining that the fourth data field matches the second data field obtained from the consumer input device based at least in part on the comparison of said at least a portion of said first hash output in the second collection of data and said corresponding at least a portion of the second hash output created at the remote destination.

5. The method of claim 4, wherein the second collection of data received at the remote destination authorizes a transaction and validating the authorization of the transaction comprises determining that the fourth data field matches the second data field obtained from the consumer input device.

6. The method of claim 1, wherein the account identifier is a primary account number (PAN) associated with a credit card and the sensitive data is a card verification value (CVV) associated with the credit card.

7. The method of claim 1, wherein the first set of data fields and the second set of data fields include a financial value associated with one of the plurality of transactions and obtained from the point of data entry device.

8. The method of claim 1, wherein the first set of data fields and the second set of data fields include a timestamp associated with one of the plurality of transactions and obtained from the point of data entry device.

9. The method of claim 1, wherein the first data field and the second data field are obtained from the consumer input device when the consumer input device is in physical proximity to the point of data entry device.

10. The method of claim 1, wherein the third data field obtained from the consumer input device is a cryptographic nonce that is different for each transaction.

11. The method of claim 1, wherein the second set of data fields included in the second collection of data is distinct with respect to the first set of data fields further at least in part by including a fifth data field obtained from the consumer input device that is not included in the first set of data fields.

12. The method of claim 1, wherein the second collection of data includes less than all of said first hash output.

13. The method of claim 12, wherein the second collection of data includes a modulus of said first hash output.

14. The method of claim 12, wherein the second collection of data includes a conversion of said first hash output to a format compatible with the second collection of data.

15. A method for securing data using a dynamic hash, the method comprising:
  creating a first hash input including a first set of data fields selected from a first collection of data, the first set of data fields including a first data field obtained from a consumer input device by a point of data entry device, a second data field obtained from the consumer input device by the point of data entry device and a third data field obtained from the point of data entry device, the first data field including an account identifier obtained from the consumer input device, the second data field including sensitive data obtained from the consumer input device, the third data field including data having a value determined independent of the consumer input device;
  performing a first hash operation on the first hash input to create a first hash output;
  assembling a second collection of data including (i) at least a portion of said first hash output and (ii) a second set of data fields selected from the first collection of data, the second set of data fields partially incorporating the first set of data fields at least in part by including the first data field obtained from the consumer input device and the third data field obtained from the point of data entry device and being distinct with respect to the first set of data fields at least in part by excluding the second data field obtained from the consumer input device;
  transmitting the second collection of data to a destination over a network;
  determining, at the destination, a fourth data field based at least in part on the first data field in the second collection of data;
  creating a second hash input from data available at the destination including the first data field, the third data field and the fourth data field;
  performing a second hash operation on the second hash input to create a second hash output at the destination;
  comparing said at least a portion of said first hash output in the second collection of data to a corresponding at least a portion of the second hash output; and
  determining that the fourth data field matches the second data field obtained from the consumer input device based at least in part on the comparison of said at least a portion of said first hash output in the second collection of data and the second hash output;
  wherein the second collection of data received at the destination authorizes a transaction with respect to an account identified by the account identifier and validating the authorization of the transaction comprises determining that the fourth data field matches the second data field obtained from the consumer input device.

16. A method for securing data using a dynamic hash, the method comprising:
  receiving, at a destination remote from a consumer input device and a point of data entry device, a collection of data including (i) at least a portion of a first hash output created by a first hash operation performed on a first hash input that includes a first set of data fields selected from a first collection of data including a first data field obtained from the consumer input device by the point of data entry device, a second data field obtained from the consumer input device by the point of data entry device and a third data field obtained from the point of data entry device, the first data field including an account identifier obtained from the consumer input device, the second data field including sensitive data obtained from the consumer input device, the third data field including data having a value determined independent of the consumer input device, and (ii) a second set of data fields selected from the first collection of data, the second set of data fields partially incorporating the first set of data fields at least in part by including the first data field obtained from the consumer input device and the third data field obtained from the point of data entry device and being distinct with respect to the first set of data fields at least in part by excluding the second data field obtained from the consumer input device;
  determining, at the destination, a fourth data field based at least in part on the first data field in the second collection of data;
  creating a second hash input from data available at the destination including the first data field, the third data field and the fourth data field;
  performing a second hash operation on the second hash input to create a second hash output at the destination;
  comparing the at least a portion of the first hash output in the second collection of data to at least a portion of the second hash output; and determining that the fourth data field matches the second data field obtained from the consumer input device based at least in part on the comparison of the at least a portion of the first hash output in the second collection of data and the at least a portion of the second hash output;

wherein the second collection of data received at the destination authorizes a transaction with respect to an account identified by the account identifier and validating the authorization of the transaction comprises determining that the fourth data field matches the second data field obtained from the consumer input device.

\* \* \* \* \*